United States Patent [19]

Hasenauer

[11] 4,439,389

[45] Mar. 27, 1984

[54] METHOD FOR SHAPEFORMING ACRYLONITRILE POLYMER AQUAGEL FILM

[75] Inventor: Randal J. Hasenauer, Fairport, N.Y.

[73] Assignee: Mobil Oil Corporation, New York, N.Y.

[21] Appl. No.: 449,127

[22] Filed: Dec. 13, 1982

[51] Int. Cl.³ .................. B29C 17/04; B29D 7/02
[52] U.S. Cl. ........................ 264/216; 264/101; 264/182; 264/331.16; 264/320; 264/322; 264/344; 264/550
[58] Field of Search ............ 264/87, 101, 102, 182, 264/206, 210.5, 216, 292, 331.16, 320, 322, 344, 550, 553

[56] References Cited

U.S. PATENT DOCUMENTS

| | | | |
|---|---|---|---|
| 3,380,949 | 4/1968 | Isley | 264/182 |
| 4,066,731 | 1/1978 | Hungerford | 264/216 |
| 4,108,818 | 8/1978 | Odawara et al. | 264/182 |
| 4,173,606 | 11/1979 | Stoy et al. | 264/182 |
| 4,325,899 | 4/1982 | Cole et al. | 264/320 |

*Primary Examiner*—James B. Lowe
*Attorney, Agent, or Firm*—A. J. McKillop; M. G. Gilman; J. F. Powers, Jr.

[57] ABSTRACT

Shapeforming acrylonitrile polymer film by providing acrylonitrile polymer aquagel film, conforming said aquagel film into the desired shape and while in said shape, heat-removing at least substantially all of the water from said aquagel film.

9 Claims, No Drawings

METHOD FOR SHAPEFORMING ACRYLONITRILE POLYMER AQUAGEL FILM

BACKGROUND OF THE INVENTION

This invention relates to the shapeforming of acrylonitrile polymer aquagel film.

It has been believed that polyacrylonitrile homopolymers cannot be thermoformed in the usual sense of the word. For example, in U.S. Pat. No. 3,380,949 it is stated: "It is known that acrylonitrile polymers including homopolymers and copolymers containing about 90% by weight or more of polymerized acrylonitrile, are not thermoplastic in nature and cannot be formed at elevated temperatures by milling, extrusion, compression molding, drawing, or by other commonly employed operations normally used in the forming of shaped articles from truly thermoplastic materials." Further, in Molecular Reviews, Interscience Publishers, John Wiley and Sons, New York, Volume 3, page 115, copyright 1968, it states:

"Polyacrylonitrile has no thermoplastic properties and for a time was found to be soluble only in aqueous salt solutions or aqueous solutions of mineral acids."

It is an object of the present invention to provide shapeformable polyacrylonitrile film and the process for shapeforming the same.

It is a further object of the present invention to provide shapeformable polyacrylonitrile aquagel film and the process for shapeforming the same.

SUMMARY OF THE INVENTION

The foregoing objects are accomplished by a process comprising:

(a) providing acrylonitrile polymer aquagel;

(b) conforming said aquagel film the desired shape; and (c) while in said shape, heat-removing at least substantially all of the water from said aquagel film.

It is preferred that the polymer is acrylonitrile homopolymer. It is also preferred prior to conforming said film to the desired shape that it be preheated to a temperature sufficient to facilitate the conformation. Following the shape formation, the structure can be rapidly cooled in order to fix the shape. It is also to be understood that prior to shapeformation, the polyacrylonitrile polymer aquagel film may be unoriented, it may be uniaxially oriented, or it may be biaxially oriented.

DETAILED DESCRIPTION OF THE INVENTION

It has been determined that polyacrylonitrile (PAN) films, prepared as described in U.S. Pat. No. 4,066,731 can be thermoformed while the polyacrylonitrile film is in the aquagel state. While it is being thermoformed the water in the aquagel film is simultaneously removed. The disclosure of U.S. Pat. No. 4,066,731 is incorporated in its entirety herein.

It is to be understood that the present invention is not only directed to the shapeformation of PAN aquagel films prepared according to the process of the '731 patent but also to PAN aquagel films prepared by any other technique.

Where acrylonitrile copolymer is employed it is understood that the non-acrylonitrile monomer thereof must not be present in a proportion large enough to change the basic characteristics of the film. In other words, it is appreciated that significant percentages of this type of comonomer can impart characteristics to a resulting copolymer which would be more representative of the polymer corresponding non-acrylonitrile monomer. This character of copolymer is not contemplated herein. Applicant's innovation concerns acrylonitrile homopolymers and acrylonitrile copolymers which retain the characteristics of the homopolymer, including its inability or resistance to thermoformation. It is preferred, when a copolymer is employed, that the units in said copolymer, derived from the acrylonitrile monomer, be present in an amount of at least about 80% by weight, and preferably, in an amount of at least 95% by weight. As indicated above, the homopolymer is preferred.

When PAN film is to be shapeformed, any thickness film can be employed, however, it is preferred that the film have a thickness ranging from about 0.5 mils to about 20 mils and preferably from about 0.65 mils to about 1.5 mils. It is to be understood, however, that shapeformation in general is contemplated and no strict numerical limitation is intended.

The polyacrylonitrile may be prepared in any conventional manner, as by emulsion polymerization, suspension polymerization, or solution polymerization. Solution polymerization is preferred and, while dimethyl sulfoxide is the preferred solvent, alternatively the solvent may be succinonitrile or a mixture of dimethyl sulfoxide and dimethyl sulfone wherein at least 50 percent by weight of said mixture is dimethyl sulfoxide.

It is generally advantageous to polymerize the acrylonitrile monomer when dissolved in the solvent, as indicated, preferably dimethyl sulfoxide, in an amount between about 30 and 60 percent by weight, based on the total weight of the solution. The optimum concentration of dissolved monomer for employment in specific instances may vary with such factors as the molecular weight which is desired to be obtained in the polymerized product, the concomitant viscosity that is desired to be achieved in the directly formed extruding solution, and the extrusion conditions.

In preparing the film-forming system, the polymerization is facilitated by use of a suitable vinyl polymerization catalyst. By the expression "vinyl monomer polymerization catalyst" is meant the well known free radical catalysts conventionally used in vinyl monomer polymerization processes. In this class, there are included organic azo compounds as disclosed in U.S. Pat. No. 2,471,959, wherein the azo, —N=N—, group is acyclic and bonded from both of the nitrogens to carbons which are alphatic in nature and at least one of which carbons is tertiary; diacyl or diaryl peroxides, such as benzoyl peroxide, t-butyl perbenzoate, cyclohexanone peroxide, and others. They may be thermally decomposed or a redox system may be used, such as peroxide with $SO_2$ and an oxidizable heavy metal ion, such as $Fe^{++}$, or an N,N'-dialkyl aniline. Salts of perdisulfuric acid are also useful in a redox system. The catalyst may be employed in a conventional manner in an amount as will be apparent to those skilled in the art. Generally, from 0.1 to about 1% by weight based on the monomer is preferred.

The extruded melt desirably should be substantially free of the volatile monomer. This can be accomplished by removing the residual monomer following polymerization, as by vacuum distillation or by conducting a post-polymerization at elevated temperatures to attain substantially 100% conversion.

Ordinarily, the polymerization may be terminated with formation of a suitable film forming solution in a time period which rarely exeeds 60 minutes and often may be as short as about 40 minutes or less. If the polyacrylonitrile is prepared by other than solution polymerization in dimethyl sulfoxide, an embodiment for practice of this invention includes recovering the polymer from the solution, washing the polymer and then dissolving it in dimethyl sulfoxide.

In general, it is preferred that the percent conversion of acrylonitrile monomer to polyacrylonitrile be at least 90%, and preferably of the order of 95-98%. The polymer will generally have a molecular weight of at least about 80,000. More particularly, the inherent viscosity of the polymer at 0.5 g/100 ml dimethyl sulfoxide, should be from about 0.85 to 1.7.

When the polyacrylonitrile-solvent solution is prepared it is then extruded through a suitable means, e.g., a slot die, and cast onto a cooled surface. The cast solution obviously should not adhere to the cooled surface and any suitable means can be used to prevent this. For example, wetting the surface with a cool water-DMSO mixture will prevent this. The concentration of the casting solution is preferably at least 30% by weight of polyacrylonitrile and preferably from about 40 to 60% by weight.

The cast film is now in condition to be backwashed or water exchanged to form the aquagel film. This is accomplished by passing the cast film through a water bath continuously until the solvent, e.g. dimethyl sulfoxide, therein is at least substantially exchanged with water.

When it is desired to use an unoriented polyacrylonitrile polymer aquagel film, the film is passed through water while not under constraint and no means are employed to orient the film either in the machine direction or transverse to the machine direction. If a uniaxially oriented aquagel film is to be formed, the cast film is passed through a water treatment chamber by means of a multiplicity of pairs of steel-rubber nipped rolls for the purpose of conveying the polymer-solution film through the water-washer while at the same time restraining the film from both longitudinal and lateral shrinkage. A differential speed between the steel and rubber rollers causes uniaxial orientation of the aquagel film. If it desired to biaxially stretch the aquagel film it is preferred that the biaxial stretching be carried out in step wise fashion, as first by longitudinal stretching and thereafter by lateral stretching, or vice versa.

The term "shapeforming" is employed herein somewhat generic to the term "Thermoforming" in that shaping without a preheating step is feasible because of the aquagel nature of the PAN film.

The terms "thermoforming" and "thermoformation" are, however, used in their usual sense and prior art techniques for thermoforming films in general are contemplated. It must be understood, however, that during thermoformation, provision must be made, according to the present invention, for the at least substantial removal of water from the aquagel film during the process of conforming the aquagel film to the desired shape. Thus, while the aquagel film is being conformed to the desired shape, for example, by bringing together a male and female die or by conforming the aquagel film to a predetermined shape in vacuum formation, means and provisions for maintaining the film in the conformed shape for a sufficient period of time to remove the water from the aquagel film by heat or by the combination of heat and the force applied during vacuum formation. The water of the aquagel film also can be removed during thermoformation through trapped air vents in, for example, the female half of a male/female die system. Time and temperature of formation can be correlated so that the moisture can be effectively removed during formation. The thermformation techniques disclosed in Modern Plastics Encyclopedia, Vol. 57, No. 10 A 1980-81, pages 406 et seq. (incorporated herein in its entirety by reference) are contemplated.

EXAMPLE 1

Homopolymer polyacrylonitrile aquagel film is prepared by the process disclosed in U.S. Pat. No. 4,066,731. In general the procedure involves heat-dissolving commercially available PAN homopolymer resin (available from du Pont Corporation as polymeric acrylonitrile Type A homopolymer) into dimethylsulfoxide (DMSO) to form an ultimately castable solution containing at least about 30% by weight PAN. The hot PAN-DMSO solution is fed under pressure to a heated die which extrudes a thin film of polymer-DMSO solution onto a cold drum surface. After contacting an aqueous solution of DMSO on the drum surface, the now self supporting film is stripped from the drum and passed through a counter current aqueous bath where DMSO is removed and replaced by water, thereby forming an aquagel film. Care is taken during the formation of the aquagel film so that orientation of the film is avoided. The guage of the aquagel film is about 10 mils.

EXAMPLE 2

The process of Example 1 is repeated except that the film is uniaxially oriented after it is stripped from the cold drum surface. The film traverses a counter-current waterbath wherein the organic solvent is removed and replaced by water thereby forming the aquagel as in Example 1. The aquagel film then passes through a machine direction orientor comprising a first heated roll which can be maintained at about 75° C. and thereafter a series of orienting rolls which are maintained at a sufficient differential speed to longitudinally stretch the aquagel film about two to three times thereby providing a uniaxially oriented aquagel film. The faster rolls can be kept at about 50° C.

EXAMPLE 3

The process of Example 2 is repeated except that the uniaxially oriented aquagel film is transported to a conventional tentering unit by which edge clips are attached to the film progressively, stretching the film perpendicular to its machine direction travel. In the transverse direction orienting unit the film is preferably contacted with moist, hot gas, e.g., air, to prevent excessive water loss. Transverse direction stretch ratios of 2:1 to 4:1 or higher may be employed. This biaxially oriented film is approximately 1.5 mil thick.

EXAMPLE 4

The film prepared by Examples 1, 2 and 3 contain a considerable percentage of water. This water is not in its conventional free state, but rather it appears that the water has entered the interstiscies and voids present in the film on a molecular scale so that it is an integral part of the film. Using film samples from the preceding examples, thermoformed structures can be prepaed on a Labform Thermoformer. A wooden female forming die is employed. The cavity is 6 inches long and 4 inches wide with a ½ inch corner and bottom radius. The die is designed so that the depth can be changed with the use of ¼ inch spacers. A 7 inch by 5 inch top clamp ring is used to hold the film. The mechanics of the thermoformation is as follows: a 14 inch by 12 inch film sample laminate is put into the retaining frame; the frame is retracted into an oven of Calrod heaters; the dwell time in the oven is insufficient to expel a significant percentage of water from the aquagel film, the time is calculated only to flexiblize the aquagel film; the frame is retracted out of the oven; the bottom die is moved up and the clamp ring down sandwiching the film therebetween; a vacuum is then engaged, drawing the film down into the female die; the female die is maintained at a temperature sufficiently high in combination with the vacuum force to remove substantially all of the water in the aquagel film during the shape formation process; after the film is dry it is cooled and the vacuum is released. The clamping ring and die is then retracted and the thermoformed structure removed from the retaining frame.

Using the foregoing equipment and technique, thermoformed structures having depths of draw ranging from ½ to 2 inches can be thermoformed. Obviously the thermoformed structures can have any suitable shape or design. Variations can be made without departing from the spirit and scope of the invention.

What is claimed is:

1. The method of shapeforming acrylonitrile polymer film comprising:
   (a) providing acrylonitrile polymer aquagel film;
   (b) conforming said aquagel film into the desired shape; and
   (c) while in said shape, heat-removing at least substantially all of the water from said aquagel film.

2. The method of claim 1 wherein prior to said conforming said film is preheated to a temperature sufficient to facilitate said conforming.

3. The method of shapeforming acrylonitrile homopolymer film comprising:
   (a) providing acrylonitrile homopolymer aquagel film;
   (b) conforming said aquagel film into the desired shape; and
   (c) while in said shape, heat-removing at least substantially all of the water from said aquagel film.

4. The method of claim 3 wherein prior to said conforming, said film is preheated to a temperature sufficient to facilitate said conforming.

5. The method of claim 3 including cooling the shaped, water-free film.

6. The method of thermoforming acrylonitrile polymer film comprising:
   (a) providing acrylonitrile polymer aquagel film by applying onto a film supporting cooled surface a concentrated solution of an acrylonitrile polymer in a solvent therefor that is water soluble, to provide a film comprising said polymer and said solvent, contacting the resulting film with an aqueous medium to at least substantially remove and replace with water the solvent in the film and recover an aquagel film consisting essentially of acrylonitrile polymer and from about 20 to about 70 percent by weight water;
   (b) preheating said film to a temperature sufficient to facilitate thermoforming;
   (c) conforming the preheated aquagel film into the desired shape;
   (d) while in said shape, heat-removing at least substantially all of the water from said aquagel film; and
   (e) cooling the shaped-water-free film.

7. The method of claim 6 wherein the acrylonitrile polymer aquagel film is unoriented prior to shape formation.

8. The method of claim 6 wherein the acrylonitrile polymer aquagel film is uniaxially oriented prior to shape formation.

9. The method of claim 6 wherein said acrylonitrile polymer aquagel film is biaxially oriented prior to shape formation.

* * * * *